United States Patent [19]
Aoki et al.

[11] Patent Number: 5,537,262
[45] Date of Patent: Jul. 16, 1996

[54] ROTATIONAL TORQUE SETTING APPARATUS FOR SCREW MECHANISM

[75] Inventors: Nobuaki Aoki; Zenichi Okura; Shinsuke Kohmoto; Hitoshi Tanaka; Kazuyoshi Azegami, all of Tokyo, Japan

[73] Assignee: Asahi Kogaku Kogyo Kabushiki Kaisha, Tokyo, Japan

[21] Appl. No.: 325,123

[22] Filed: Oct. 18, 1994

[30] Foreign Application Priority Data

Oct. 19, 1993 [JP] Japan ................................ 5-056420 U
Mar. 1, 1994 [JP] Japan ..................................... 6-031176

[51] Int. Cl.⁶ .................................................... G02B 7/02
[52] U.S. Cl. .......................... 359/822; 359/820; 359/819
[58] Field of Search ..................................... 359/819, 820, 359/822, 823, 827, 829, 830, 694, 699, 700; 354/195.1, 195.12, 195.13

[56] References Cited

U.S. PATENT DOCUMENTS

| | | | |
|---|---|---|---|
| 4,560,237 | 12/1985 | Ohkura et al. | |
| 4,720,167 | 1/1988 | Okura | 359/819 |
| 4,793,688 | 12/1988 | Aiki et al. | 359/819 |
| 4,854,671 | 8/1989 | Hanke et al. | 359/820 |
| 4,944,030 | 7/1990 | Haraguchi et al. | |
| 4,974,949 | 12/1990 | Tanaka | |
| 5,144,493 | 9/1992 | Nomura | 359/700 |
| 5,210,644 | 5/1993 | Nomura | 359/694 |
| 5,225,938 | 7/1993 | Nomura | 359/699 |
| 5,245,476 | 9/1993 | Shono | 359/699 |
| 5,249,082 | 9/1993 | Newman | 359/819 |
| 5,327,184 | 7/1994 | Nomura et al. | 354/195.1 |
| 5,349,475 | 9/1994 | Nomura et al. | 354/694 |
| 5,365,373 | 11/1994 | Tanaka | 359/601 |

FOREIGN PATENT DOCUMENTS

| | | | |
|---|---|---|---|
| 159509 | 9/1983 | Japan | 359/820 |
| 178306 | 10/1983 | Japan | 359/820 |
| 31914 | 2/1984 | Japan | 359/820 |
| 230609 | 11/1985 | Japan | 359/820 |

*Primary Examiner*—Loha Ben
*Attorney, Agent, or Firm*—Greenblum & Bernstein

[57] ABSTRACT

An apparatus for setting the rotational torque of a screw mechanism including a frictional member which is positioned between a lens frame and a lens frame holder. The frictional member can be made of natural fiber, sponge, rubber, or styrene foam.

22 Claims, 5 Drawing Sheets

ROTATIONAL TORQUE SETTING APPARATUS FOR SCREW MECHANISM

BACKGROUND OF THE INVENTION

1. Field of the Invention

The present invention is directed to an apparatus for setting a rotational torque of a screw mechanism and further relates to a friction mechanism between a lens frame and a lens frame holder.

2. Description of the Related Art

The rotational torque of a screw mechanism mainly depends upon how accurate the screws used in the screw mechanism are made and the length of the engaged portion of the screw threads. When it is necessary to provide a large rotational torque in a screw mechanism, a biasing member or a spring member is generally provided in a space formed between a male screw thread and a female screw thread which engage with each other. However, when a biasing member is provided in a screw mechanism, since providing the above space is necessary, the screw mechanism cannot be kept compact. In the case where a leaf spring is provided as the biasing member in the above space, it is sometimes the case that the desired torque cannot be obtained due to a movement transformation of the leaf spring or the like. For instance, in a lens barrel having such a screw mechanism, the position of a lens (or lenses) in the optical axis direction is adjusted by rotating a screw member which supports the lens (or lenses) during the assembly process of the lens barrel. If the rotational torque of the screw mechanism in the lens barrel is not large enough, the screw thread can be accidentally rotated after the position of a lens (or lenses) in the optical axis direction has been adjusted, and before the screw thread is fixed by means of adhesive or the like so as not to be rotatable, resulting in an inaccurate position of the lens (or lenses).

In general, the photographing lens of a camera, for example includes a movable lens secured to a lens frame, and a lens frame holder which holds the lens frame, so that the lens frame is moved through a roller pin provided on the lens frame, a linear movement guide mechanism and a cam mechanism, etc.

In such a known lens holding mechanism, there is a gap or play in a radial direction between the lens frame and the lens frame holder, thus resulting in a deviation of the lens from the optical axis.

SUMMARY OF THE INVENTION

The primary object of the present invention is to provide a rotational torque setting apparatus for a screw mechanism with which a rotational torque can be adjusted by a simple and compact mechanism. Another object of the present invention is to prevent play, between a lens frame and a lens frame holder, from occurring.

To achieve the objects mentioned above, according to the present invention, a rotational torque setting apparatus is provided for a screw mechanism. This apparatus includes a male screw member on which a male thread portion is formed and a female screw member on which a female thread portion is formed. The female screw member is connected to the male screw member with the male thread portion engaged with the female thread portion in a screwed fashion. An outer-facing barrel surface portion is formed on the male screw member and an inner-facing barrel surface portion is formed on the female screw member. Thus, the inner-facing barrel surface portion faces the outer-facing barrel surface portion while maintaining a space between the outer-facing barrel surface portion and the inner-facing barrel surface portion. A frictional member is provided on one of the outer-facing barrel surface portion and the inner-facing barrel surface portion, so that the frictional member comes into contact with the other barrel surface.

The male thread portion and the female thread portion may be formed separately from the outer-facing barrel surface portion and the inner-facing barrel surface portion at different positions in the optical axis direction, respectively. In order to make the rotational torque setting apparatus more compact, preferably, the male thread portion consists of divided male thread portions, the outer-facing barrel surface portion consists of outer-facing divided barrel surface portions, and the divided male thread portions and the outer-facing divided barrel surface portions are alternately formed on the male screw member in a circumferential direction of the male screw member. Likewise, the female thread portion consists of divided female thread portions, the inner-facing barrel surface portion consists of inner-facing divided barrel surface portions, and the divided female thread portions and the inner-facing divided barrel surface portions are alternately formed on the female screw member in a circumferential direction of the female screw member.

The frictional member may be set (i.e. formed) directly on one of the outer-facing barrel surface portion and the inner-facing barrel surface portion, or the frictional member may be fixed onto one of the outer-facing barrel surface portion and the inner-facing barrel surface portion by means of an adhesive.

The frictional member may be comprised of a base and a bristle portion, with the base fixed onto one of the outer-facing barrel surface portion and the inner-facing barrel surface portion by means of adhesive.

The frictional member may be made of a material such as; natural fiber, sponge, rubber, styrene foam, for example.

According to the present invention, a friction mechanism is further provided comprising a lens frame which holds a lens, a lens frame holder which holds the lens frame and which moves in the optical axis direction, and a lens keeper provided on the lens frame to press the lens against the lens frame holder in an optical axis direction of the lens. The lens keeper is further provided with a friction member which elastically abuts against the lens frame holder. Namely, according to the present invention, the lens keeper functions not only to press the lens in the optical axis direction but also to press the lens frame holder in the radial direction.

The present disclosure relates to subject matter contained in Japanese patent application No. 6-31176 (filed on Mar. 1, 1994) and Japanese utility model application No. 5-56420 (filed on Oct. 19, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

An object of the present invention is to prevent play between a lens frame and a lens frame holder from occurring. Another object of the present invention is to adjust the rotational torque between a lens frame and a lens frame holder, the lens frame being provided on its outer peripheral surface with a male thread portion which engages with a female thread portion formed on the inner peripheral surface of the lens frame holder.

Figure 5:
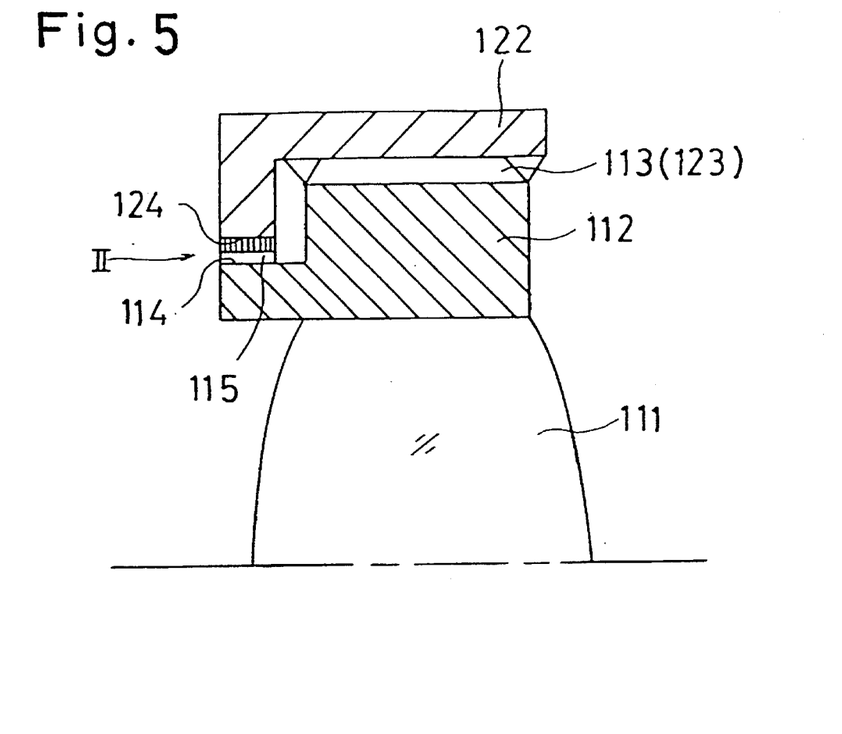
FIG. 5 is a sectional view of a part of a lens barrel to which a rotational torque setting apparatus for a screw mechanism of the first embodiment of the present invention is applied, showing only an upper half thereof.
Figure 6:
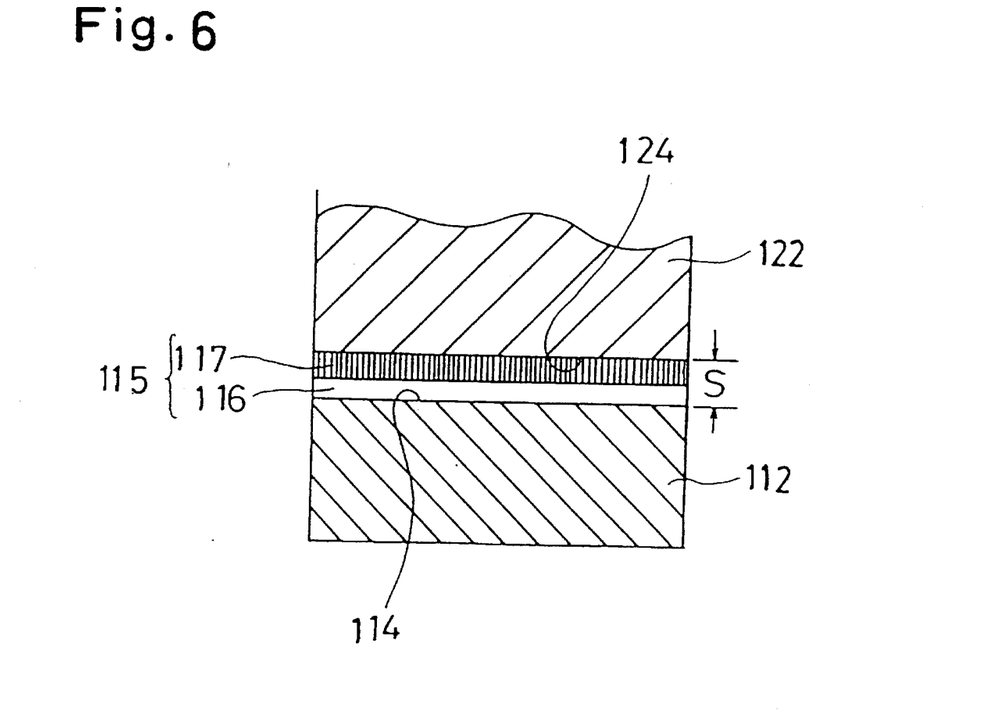
FIG. 6 is an enlarged sectional view of the portion II shown in FIG. 5.
Figure 7:
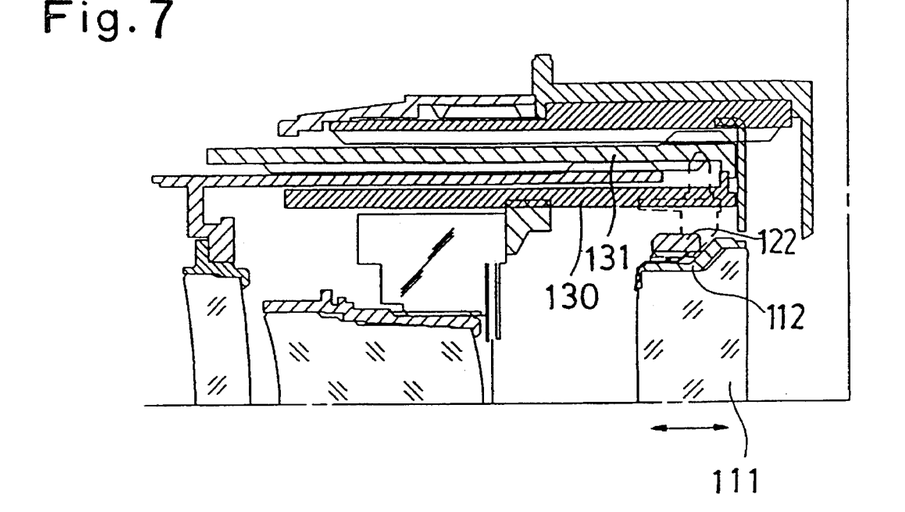
FIG. 7 is a sectional view of a lens barrel to which a rotational torque setting apparatus for a screw mechanism of the present invention is applied, showing only an upper half thereof.

FIGS. 5 and 6 show a basic structure of the first embodiment of the present invention. A lens frame (i.e., a male screw member) 112 to which a lens 111 is fixed is provided on its outer peripheral surface with a male thread portion 113 and a barrel surface portion (i.e., outer-facing barrel surface portion) 114. The male thread portion 113 and barrel surface portion 114 are formed on different circumferential portions of the lens frame 112 in the optical axis direction, and also at different positions along a radial direction of the lens frame 112. A female thread portion 123 and a barrel surface portion (i.e., inner-facing barrel surface portion) 124 are formed on the inner peripheral surface of a lens frame holder (i.e., a female screw member) 122. The female thread portion 123 engages with the male thread portion 113 in a screwed fashion. The barrel surface portion 124 faces the barrel surface portion 114 while maintaining a space "S" between the barrel surface portion 124 and the barrel surface portion 114 in the state where the male and female thread portions 113 and 123 engage with each other in a screwed fashion. A frictional member 115 which consists of a base 116 and a bristle portion 117, made of a large number of short bristles sticking out of the base 116, is fixed to the barrel surface portion 114 by means of an adhesive (not shown). The bristle portion 117 comes into contact with the barrel surface portion 124 in a slidable manner. The thickness of the frictional member 115 in a free state is made larger than that of the space "S". Therefore, when the lens frame 112 rotates with respect to the lens frame holder 122, with the frictional member 115 provided in the space "S", a frictional force occurs between the bristle portion 117 and the barrel surface portion 124.

With the structure of this embodiment, the rotational torque of the lens holder 112 is increased by means of the frictional member 115. Furthermore, the rotational torque of the lens frame 112 (i.e., the maximum stationary frictional force between the lens frame 112 and the lens frame holder 122) can be varied by changing the length, density and/or hardness of bristle of the bristle portion 117.

Figure 8:
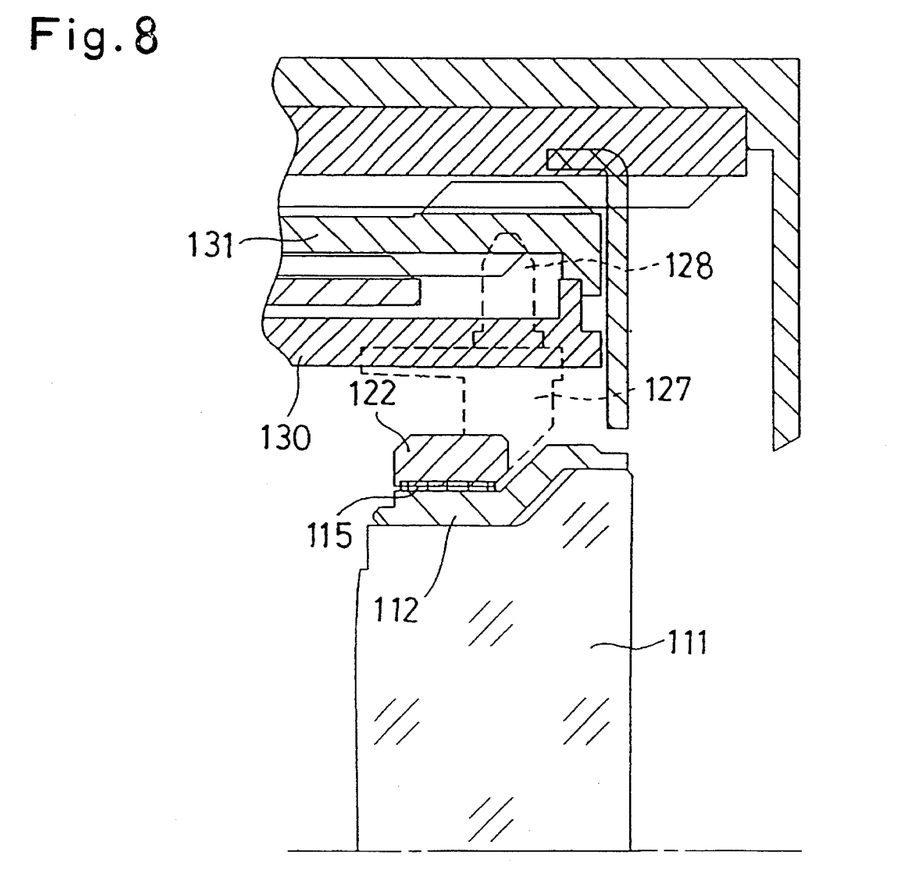
FIG. 8 is a sectional view of a part of a lens barrel to which a rotational torque setting apparatus of the second embodiment is applied.

FIG. 8 shows a second embodiment of the present invention. In this embodiment, divided male helicoid portions (i.e., divided male thread portions) 113H (see FIG. 9) are formed as male thread portion on the outer peripheral surface of the lens frame 112 at regular intervals. The remaining portions of the outer peripheral surface of the lens frame 112, on which divided male helicoid portions 113H are not formed, are formed as divided barrel surface portions (i.e., outer-facing divided barrel surface portion) 114H (see FIG. 9). That is, the divided male helicoid portions 113H and the divided barrel surface portions 114H are alternately formed on the outer peripheral surface of the lens frame 112 in a circumferential direction of the lens frame 112. The frictional member 115 is bonded to each of the divided barrel surface portions 114H.

In contrast to this, the divided female helicoid portions (i.e., divided female thread portions) 123H serving as female thread portions and divided barrel surface portions 124H (i.e., inner-facing divided barrel surface portion) are alternately formed on the inner peripheral surface of the lens frame holder 122 in a circumferential direction of the lens frame holder 122. The divided male helicoid portions 113H are engaged with the corresponding divided female helicoid portions 123H in a screwed fashion. In this engaged state, the hair (or bristle) portions 117 of the frictional members 115 come into contact with the divided barrel surface portions 124H.

Figure 9:
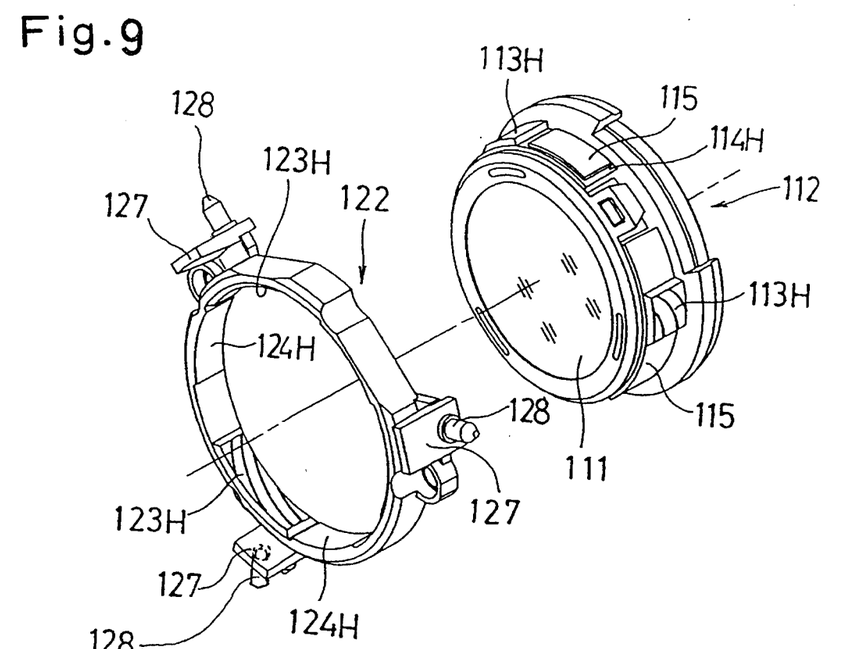
FIG. 9 is an isometric view of male and female screw members before engaged with each other in a screwed fashion according to the third embodiment; and, FIG. 10 is an isometric view of male and female screw members before being engaged with each other in a screwed fashion, seen from a different angle to that of FIG. 9.
Figure 10:
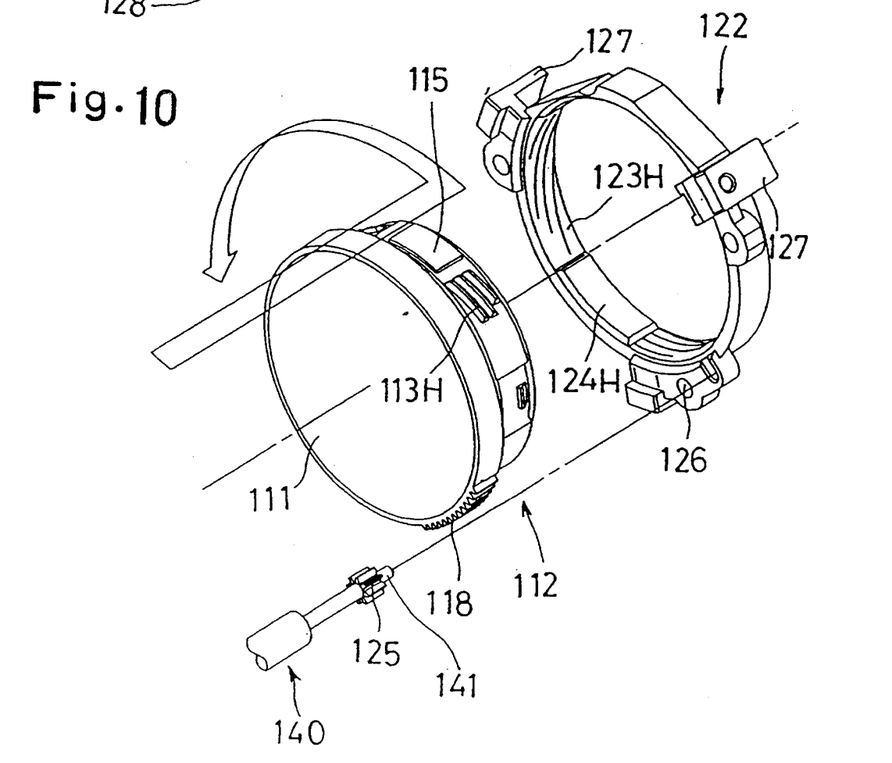

FIGS. 9 and 10 shows a third embodiment of this present invention, wherein the position of the lens 111 in the optical axis direction can be adjusted during the assembly process, to which the present invention is applied. For this reason, the lengths of the divided male helicoid portions and divided female helicoid portions 113H and 123H are minimal, just for adjustment purpose. A sector gear 118 is formed on the outer peripheral surface of the lens 111. The lens frame holder 122 is provided with a supporting hole 126 in which the tip 141 of the adjusting pinion driver 140 can be inserted. In the state where the tip 141 is inserted in the supporting hole 126, a pinion 125 which is fixed on the adjusting pinion driver 140 is engaged with the sector gear 118.

In the state where the divided male helicoid portions 113H are engaged with the corresponding divided female helicoid portions 123H in a screwed fashion, the tip 141 of the adjusting pinion driver 140 is inserted in the supporting hole 126. Thereafter, by rotating the adjusting pinion driver 140, the lens frame 112 is rotated through the pinion 125 and the sector gear 118. Accordingly the lens frame 112, i.e., the lens 111, is moved in the optical axis direction through the divided male helicoid portions 113H and the divided female helicoid portions 123H. When the lens frame 112 is rotated with respect to the lens frame holder 122, since the bristle portions 117 of the frictional members 115 come into contact with the corresponding divided barrel surface portions 124H, a rotational torque of a proper amount is given to the lens frame 112. After the position of the lens 111 with respect to the lens frame holder 122 in the optical axis direction has been adjusted, the adjusting pinion driver 140 is removed, then the lens frame 112 is fixed to the lens frame holder 122 by adhesive. Thus a lens position adjustment is completed. In this embodiment, similar to the previous embodiment, the rotational torque of the lens frame 112 can be varied by changing the length, density and/or hardness of bristles of the bristle portion 117.

The lens frame holder 122 is provided on its outer peripheral surface with three projections 127. Each projection 127 is provided with a cam pin 128 projecting in a radial direction of the lens frame holder 122. The projections 127 are slidably fitted in corresponding linear guiding grooves (not shown) formed on a linearly movable barrel 130, and the cam pins 128 are fitted in corresponding cam grooves (not shown) formed on a cam ring 131. Therefore, when the cam ring 131 rotates, the lens frame holder 122 supporting the lens 111 is moved together with the other lens groups while varying the distance therebetween in the optical axis direction to effect a zooming operation.

In the above embodiments, in place of the frictional member 115, a different type of frictional member made of a material such as; natural fiber, sponge, rubber, styrene foam for example, can be used. Moreover, bristles similar to those of the bristle portion 117 may be set directly on the barrel surface portion 114 or the divided barrel surface portions 114H. Rubber, for example, may be evaporated and put on the barrel surface portion 114 or the divided barrel surface portions 114H. Furthermore, although a friction member is provided on the lens frame 112 in the above embodiments, a friction member may be instead provided on the lens frame holder 122.

Figure 1:
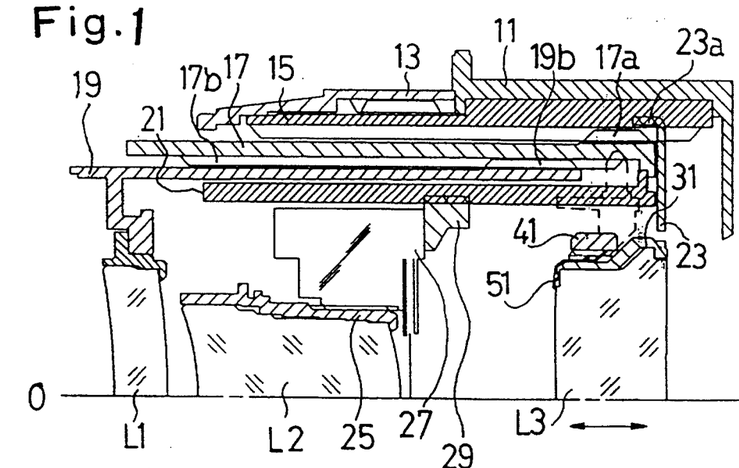
FIG. 1 is a longitudinal sectional view of an upper half of a lens shutter type camera to which the fourth embodiment of the present invention is applied.
Figure 2:
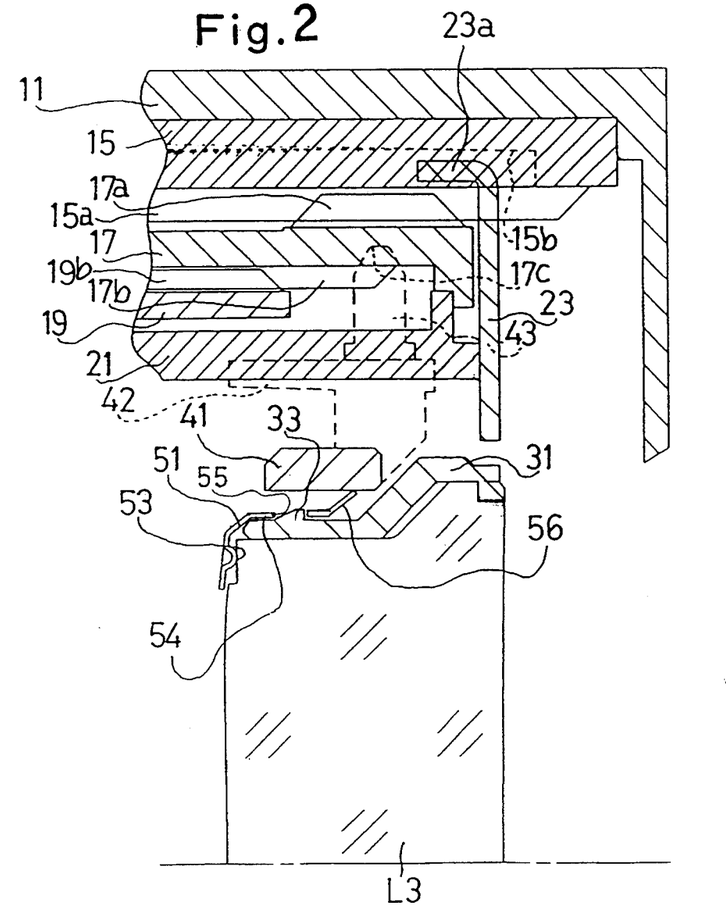
FIG. 2 is an enlarged longitudinal sectional view of FIG. 1.

The fourth embodiment of the present design is shown in FIGS. 1 and 2. A lens shutter type camera is shown with a zoom lens which is comprised of three lens groups L1, L2 and L3. In FIGS. 1 and 2, the left side and the right side correspond to the object side and the film side, respectively.

The body frame 11 (stationary member) is provided, on the end thereof adjacent to an object to be photographed, with an adjusting ring 13 secured thereto to adjust the back-focal distance. A stationary ring 15 is fitted in the body frame 11 and the adjusting ring 13 so as to move in the optical axis direction during the adjustment of the back-focal distance. The stationary ring 15 is provided therein with a cam ring 17 in which a first lens barrel 19 is provided. A linearly movable barrel 21 is provided within the first lens barrel 19.

The stationary ring 15 and the cam ring 17 are mated to each other through a helicoid 15a formed on the inner peripheral surface of the stationary ring 15 and a helicoid 17a formed on the outer peripheral surface of the cam ring 17. The cam ring 17 is mated to the first lens barrel 19 through a helicoid 17b formed on the inner peripheral surface of the cam ring 17 and a helicoid 19b formed on the outer peripheral surface of the first lens barrel 19. The first lens barrel 19 and the linearly movable barrel 21 are mated to each other through a linear movement guide groove (not shown) formed on the inner peripheral surface of the first lens barrel 19 and a projection (not shown) provided on the outer peripheral surface of the linearly movable barrel 21. The projection (not shown) is fitted in the linear movement guide groove so as to move in the optical axis direction without rotating. The cam ring 17 and the linearly movable barrel 21 are associated so as to relatively rotate with respect to each other, but move together in the optical axis direction.

The linearly movable barrel 21 is provided with a guide plate 23 secured to the end thereof, which is in turn provided on the front end thereof with a bent portion 23a which is fitted in a linear movement guide groove 15b formed in the stationary ring 15 and extending in the optical axis direction. Consequently, the linearly movable barrel 21 is linearly moveably guided by the guide plate 23 and the linear movement guide groove 15b so as not to rotate relative to the stationary ring 15.

The first lens group L1 is secured to the front end of the first lens barrel 19. The second lens group L2 is provided within the linearly movable barrel 21. The second lens group L2 is secured to a second lens frame 25 which is connected to a doughnut-shaped AF shutter block 27 through a helicoid mechanism. The AF shutter block 27 is secured to a shutter holding frame 29 which is provided with a plurality of rollers (not shown) that extend through linear movement guide grooves (not shown) formed in the linearly movable barrel 21 and the first lens barrel 19 to be fitted in a cam groove (not shown) formed in the cam ring 17. Consequently, when the rotation of the cam ring 17 takes place, the second lens frame 25 and the second lens group L2 are moved relative to the linearly movable barrel 21 in the optical axis direction.

There is a third lens group L3 behind the second lens group L2 within the linearly movable barrel 21. The third lens group L3 is fitted in a third lens frame 31 which is fitted in a third lens frame holding cylinder (lens frame holder) 41. The lens frame holder cylinder 41 is provided on the outer peripheral surface thereof with a plurality of guide projections 42 that are provided with roller pins 43 that may rotate with respect thereto. The guide portions 42 are fitted in linear movement guide grooves formed in the linearly movable barrel 21. The roller pins 43 extend through openings of the linear movement guide grooves of the linearly movable barrel 21 and are fitted in the cam groove 17c formed in the cam ring 17. Consequently, the third lens frame holding cylinder 41, the third lens frame 31 and the third lens group L3 are linearly movable in the optical axis direction along the linear movement guide grooves of the linearly movable barrel 21.

The cam ring 17 is provided on the outer peripheral surface thereof with a spiral gear which is in mesh with a pinion (not shown) which is connected to a drive shaft of a zoom motor (not shown) through a gear train, so that when the zoom motor is rotated, the cam ring 17 is rotated through the pinion and the spiral gear to effect the zooming.

The zoom lens constructed as above operates as follows, during zooming.

When the cam ring 17 is rotated, axial movement thereof in the optical axis direction takes place. The rotation and axial movement of the cam ring 17 cause the first lens barrel 19 to move in the optical axis direction without rotating. As a result, the first lens group L1 is moved together with the first lens barrel 19 in the optical axis direction.

Also, the axial movement of the cam ring 17 in the optical axis direction causes the linearly movable barrel 21 to move in the optical axis direction without rotating together with the cam ring 17. Since the cam ring 17 and the linearly movable barrel 21 are relatively moved in the optical axis direction, the second lens barrel 12 and the third lens barrel L3 are relatively moved in the optical axis direction through the cam groove of the cam ring 17.

Thus, zooming is accomplished by the relative movement of the first lens group L1, the second lens group L2, and the third lens group L3 to move away from or to approach each other.

The supporting structure of the third lens group L3, which is one of the significant features of the present invention, will be discussed below with reference to FIGS. 3 and 4.

Figure 3:
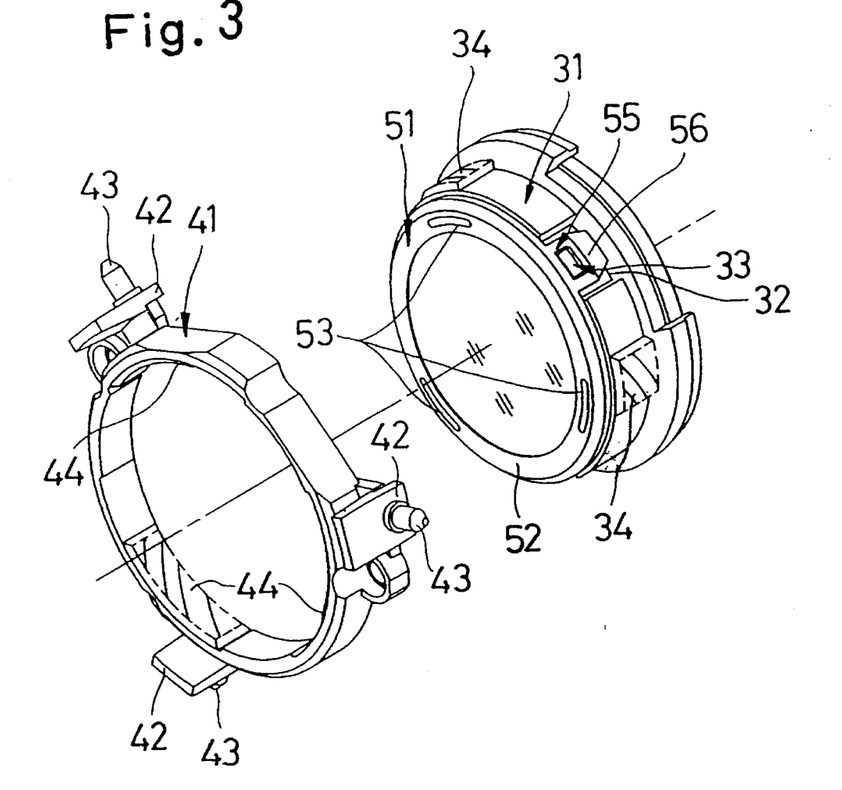
FIG. 3 is an exploded perspective view of a third lens frame and a third lens frame holding cylinder; and, FIG. 4 is a cross sectional view of the third lens frame and the third lens frame holding cylinder shown in FIG. 3.
Figure 4:
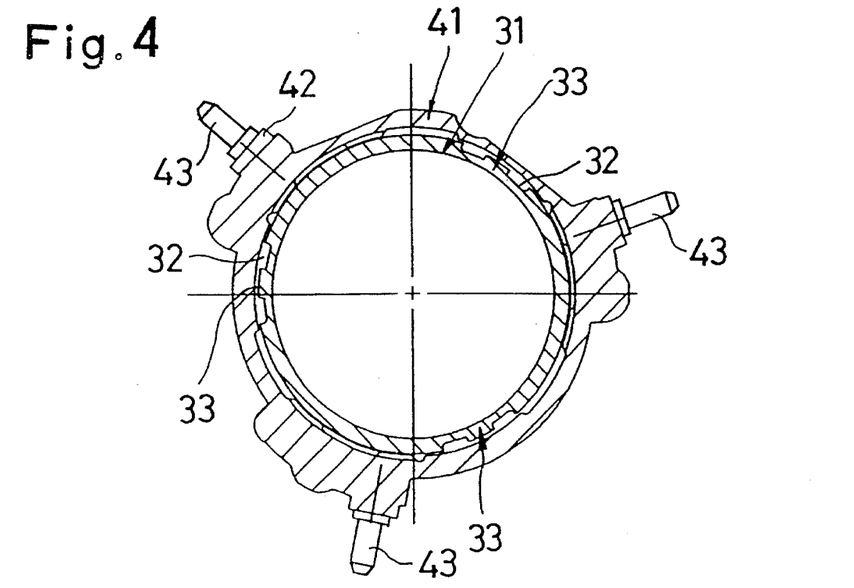

FIG. 3 shows an exploded perspective view of the third lens frame 31 and the third lens frame holding cylinder 41. FIG. 4 shows a sectional view of the third lens frame 31 and the third lens frame holding cylinder 41 assembled together.

The lens holding mechanism which holds the third lens group L3, includes the third lens frame 31, which directly holds the third lens group L3, and a third lens frame holding cylinder 41 which holds the third lens frame 31, which in turn holds the third lens group L3. The third lens frame 31 is cylindrical and holds therein the third lens group L3. The third lens group L3, attached to the third lens frame 31, is elastically and firmly pressed against the third lens frame 31 by an annular lens keeping plate 51. The third lens frame 31 and the third lens frame holding cylinder 41 are interconnected through helicoids, so that when the third lens frame 31 is rotated, the third lens frame 31 is moved in the optical axis direction relative to the third lens frame holding cylinder 41.

The third lens frame holding cylinder 41 is provided with the three guide projections 42, each having the roller 43, as mentioned above. The guide portions 42 are fitted in the linear movement guide grooves formed in the linearly movable barrel 21, and the rollers 43 extend through the linear movement guide grooves and are fitted in the cam groove 17b of the cam ring 17. The third lens frame holding cylinder 41 is guided along the linear movement guide grooves of the linearly movable barrel 21 in the optical axis direction, so that the third lens frame holding cylinder 41 is reciprocally moved through the cam groove 17 and the rollers 43, in the optical axis direction when the cam ring 17 is rotated.

The lens keeping plate 51 is made of a metal or plastic material, which is elastically deformable. The lens keeping plate 51 is provided with an annular body 52 made of a hollow disc and a plurality of spaced projections 53 provided on the outer peripheral surface of the annular body 52 (FIG. 2) to abut against the third lens group L3 so as to bias the lens L3 in an optical axis direction of the lens. The annular body 52 is provided with a plurality of bent tongues 54 extending from the outer peripheral edge of the annular body 52 in a direction parallel to the optical axis. The tongues 54 are arranged at equi-angular distances around the lens L3. Each of the bent tongues 54 has an engaging hole 55 approximately at the center portion thereof. The lens keeping plate 51 is secured to the third lens frame 31, to hold the third lens group L3 with respect to the third lens frame 31, when engaging pawls 33, which are provided on the outer surface of the third lens frame 31 are fitted in the corresponding engaging holes 55. The tongues 54 constitute, at the front free ends thereof, friction portions 56 which are bent in the direction away from the optical axis (toward the third lens frame holding cylinder 41).

The third lens frame 31 is provided on the outer peripheral surface thereof with a helicoid 34 which is screw-engaged by a helicoid 44 formed on the inner surface of the third lens frame holding cylinder 41. When the third lens frame 31 is inserted and rotated in the third lens frame holding cylinder 41 from the lens keeping plate side, the helicoid 34 is screw-engaged by the helicoid 44, so that the third lens frame 31 is mounted to the third lens frame holding cylinder 41. In this state, the friction portions 56 elastically abut against the inner surface of the third lens frame holding cylinder 41 to thereby bias the third lens frame 31 in the radial directions. Thus, there is no play or gap between the helicoids 34 and 44.

When the third lens frame 31 is rotated to adjust the axial position of the third lens group L3 in the optical axis direction, the third lens frame 31 is moved in the optical axis direction with the help of the helicoids 33 and 44 while rotating with respect to the third lens frame holding cylinder 41. During the rotation of the third lens frame 31, since the friction portions 56 slide while maintaining elastic contact with the inner peripheral surface of the third lens frame holding cylinder 41, there is no play between the helicoids 34 and 44, and accordingly, no accidental or unintended displacement of the third lens frame takes place.

Moreover, upon completion of the adjustment of the axial position of the third lens group L3, the third lens frame 31 is held in the adjusted position by the frictional force between the engaging holes 55 (i.e., pawls 33) and the inner surface of the third lens frame holding cylinder 41.

As can be understood from the foregoing, according to the present invention, the lens holding means for holding the third lens group L3 is comprised of two members, i.e., the third lens frame 31 and the third lens frame holding cylinder 41. The third lens frame 31 and the third lens frame holding cylinder 41 are engaged with each other by the helicoids so as to adjust the axial position thereof in the optical axis direction. Furthermore, since the friction portions 56, that are elastically brought into contact with the third lens frame holding cylinder 41, are formed on the lens keeping plate 51 which presses the third lens group L3 against the third lens frame 31, there is no play produced during the adjustment of the axial position of the third lens frame 31. In addition to the foregoing, since the friction portions 56 are provided on the lens keeping plate 51, no special space for the friction portions is necessary.

Although the third lens frame 31 and the third lens frame holding cylinder 41 are interconnected by the helicoids in the illustrated embodiment, the present invention is not limited thereto. Namely, the third lens frame 31 and the third lens frame holding cylinder 41 can be interconnected by any connecting means which permit the same to relatively move in the optical axis direction.

Although the present invention is applied to the lens holding means for the third lens group L3 in the illustrated embodiment, the present invention is not limited thereto. For example, the present invention can be equally applied to a lens holding means for the first lens group L1 or the second lens group L2.

As can be seen from the above discussion, according to the present invention, since the lens holding means is comprised of a lens frame and a lens frame holder, both being adjustable in the optical axis direction, and the friction device for elastically biasing the lens frame holder is provided on the lens keeper which presses the lens against the lens frame, there is no play between the lens frame and the lens frame holder during the adjustment of the axial position in the optical axis direction.

As can be seen from the foregoing, according to the present invention, the rotational torque of a screw mechanism can be set by a simple and non-space-consuming mechanism of the apparatus.

We claim:

1. A rotational torque setting apparatus for a screw mechanism, comprising:

a male screw member on which a male thread portion is formed;

a female screw member on which a female thread portion is formed, wherein said female screw member is connected to said male screw member with said male thread portion engaged with said female thread portion in a screwed fashion;

an outer-facing barrel surface portion formed on said male screw member;

an inner-facing barrel surface portion formed on said female screw member, wherein said inner-facing barrel surface portion faces said outer-facing barrel surface portion while maintaining a space between said outer-facing barrel surface portion and said inner-facing barrel surface portion; and, a frictional member provided on one of said outer-facing barrel surface portion and said inner-facing barrel surface portion, wherein said frictional member comes into contact with the other of said outer-facing barrel surface portion and said inner-facing barrel surface portion.

2. The rotational torque setting apparatus of claim 1, wherein said male thread portion consists of divided male thread portions, wherein said outer-facing barrel surface portion consists of outer-facing divided barrel surface portions, wherein said divided male thread portions and said outer-facing divided barrel surface portions are alternately formed on said male screw member in a circumferential direction of said male screw member, wherein said female thread portion consists of divided female thread portions, wherein said inner-facing barrel surface portion consists of inner-facing divided barrel surface portions, and wherein said divided female thread portions and said inner-facing divided barrel surface portions are alternately formed on said female screw member in a circumferential direction of said female screw member.

3. The rotational torque setting apparatus of claim 2, wherein said frictional member is set directly on one of said outer-facing barrel surface portion and said inner-facing barrel surface portion.

4. The rotational torque setting apparatus of claim 2, wherein said frictional member is fixed onto one of said outer-facing barrel surface portion and said inner-facing barrel surface portion by adhesive.

5. The rotational torque setting apparatus of claim 4, wherein said frictional member consists of a base and a hair portion, said base being fixed onto one of said outer-facing barrel surface portion and said inner-facing barrel surface portion by adhesive.

6. The rotational torque setting apparatus of claim 4, wherein said frictional member is made of one of natural fiber, sponge, rubber, or styrene foam.

7. The rotational torque setting apparatus of claim 1, wherein said frictional member is set directly on one of said outer-facing barrel surface portion and said inner-facing barrel surface portion.

8. The rotational torque setting apparatus of claim 1, wherein said frictional member is fixed onto one of said outer-facing barrel surface portion and said inner-facing barrel surface portion by adhesive.

9. The rotational torque setting apparatus of claim 8, wherein said frictional member consists of a base and a bristle portion, said base being fixed onto one of said outer-facing barrel surface portion and said inner-facing barrel surface portion by adhesive.

10. The rotational torque setting apparatus of claim 8, wherein said frictional member is made of one of natural fiber, sponge, rubber, or styrene foam.

11. A rotational torque setting apparatus for a screw mechanism used for a lens barrel, comprising:

a ring-shaped lens frame which supports a lens and includes a male thread portion formed on an outer peripheral surface of said lens frame;

a ring-shaped lens frame holder which includes a female thread portion formed on an inner peripheral surface of said lens frame holder; wherein said lens frame holder is connected to said lens frame with said male thread portion engaged with said female thread portion in a screwed fashion;

an outer-facing barrel surface portion formed on an outer peripheral surface of said lens frame;

an inner-facing barrel surface portion formed on an inner peripheral surface of said lens frame holder, wherein said inner-facing barrel surface portion faces said outer-facing barrel surface portion while maintaining a space between said outer-facing barrel surface portion and said inner-facing barrel surface portion; and, a frictional member provided on one of said outer-facing barrel surface portion and said inner-facing barrel surface portion, wherein said frictional member comes into contact with the other of said outer-facing barrel surface portion and said inner-facing barrel surface portion.

12. A friction mechanism of a lens frame comprising:

a lens frame which holds a lens;

a lens frame holder which holds said lens frame; and, a lens keeper provided on said lens frame to press said lens in an optical axis direction of said lens so as to keep said lens in contact with said lens frame;

said lens keeper comprising a plurality of frictional members which elastically abut against said lens frame holder in a radial direction of said lens, said frictional members being provided in a spaced manner in a circumferential direction of said lens.

13. The friction mechanism according to claim 12, further comprising helicoid engagement means between said lens frame and said lens frame holder to connect said lens frame and said lens frame holder.

14. The friction mechanism according to claim 12, wherein said lens keeper comprises an annular body having projections which press said lens in an optical axis direction, a plurality of bent tongues extending from an outer peripheral edge of said annular body in a direction parallel to said optical axis, an engaging hole provided on at least one of said bent tongues, said engaging hole engageable with a corresponding pawl formed on said lens frame, and friction portions provided at free ends of said tongues to elastically come into contact with said lens frame holder in a radial direction.

15. A friction mechanism according to claim 12, wherein said frictional members are arranged at equi-angular distances around said lens.

16. The friction mechanism according to claim 12, said lens frame holder including means for enabling adjustment of said lens frame with respect to said lens frame holder in the optical axis direction.

17. The friction mechanism according to claim 12, said lens frame being rotatably adjustable relative to said lens frame holder.

18. A lens barrel comprising:

a lens frame which holds a lens;

a lens frame holder which holds said lens frame; and, an annular lens keeper provided on said lens frame, said annular lens keeper having a plurality of projections which press said lens in an optical axis direction of said lens so as to keep said lens in contact with said lens frame and a plurality of frictional members which elastically abut against said lens frame holder in a radial direction of said lens, said frictional members being spaced in a circumferential direction of said lens with respect to each other.

19. A friction mechanism according to claim 18, wherein said frictional members are arranged at equi-angular distances around said lens.

20. The lens barrel according to claim 18, said lens frame holder including means for enabling adjustment of said lens frame with respect to said lens frame holder in the optical axis direction.

21. An annular lens keeper provided on a lens frame, comprising:

an annular body having projections which press a lens in an optical axis direction to keep said lens in contact with said lens frame;

a plurality of bent tongues extending from an outer peripheral edge of said annular body in a direction parallel to an optical axis of the lens;

at least one engaging hole provided on said bent tongues, said engaging hole engageable with a corresponding pawl formed on said lens frame; and a frictional member provided at a free end of each of said tongues, each said frictional member elastically coming into contact with a lens frame holder, each of said lens frame and said lens frame holder including threaded portions, said lens frame being threadedly engaged with said lens frame holder via said threaded portions.

22. An annular lens keeper according to claim 21, wherein said frictional members are arranged at equi-angular distances around said lens.

* * * * *